(12) United States Patent
Burgoyne et al.

(10) Patent No.: US 7,738,123 B2
(45) Date of Patent: Jun. 15, 2010

(54) KEYLOCK FLASH DISK DEVICE

(75) Inventors: Keith Burgoyne, Westminister, CA (US); Bond Fletcher, Encinitas, CA (US)

(73) Assignee: Troy Group, Inc., Costa Mesa, CA (US)

( * ) Notice: Subject to any disclaimer, the term of this patent is extended or adjusted under 35 U.S.C. 154(b) by 1198 days.

(21) Appl. No.: 10/896,089

(22) Filed: Jul. 21, 2004

(65) Prior Publication Data

US 2006/0017973 A1 Jan. 26, 2006

(51) Int. Cl.
*G06K 15/02* (2006.01)
*G06F 3/12* (2006.01)
*G06K 15/00* (2006.01)

(52) U.S. Cl. .............. 358/1.11; 358/1.13; 358/1.16

(58) Field of Classification Search ............ 358/1.1, 358/1.11–1.18, 1.9; 399/12, 111, 51, 67, 399/81
See application file for complete search history.

(56) References Cited

U.S. PATENT DOCUMENTS

| 6,011,935 | A | * | 1/2000 | Matsuzaka et al. | 399/12 |
| 6,148,354 | A | | 11/2000 | Ban et al. | 710/102 |
| 6,587,140 | B2 | * | 7/2003 | No | 348/207.2 |
| 6,658,219 | B1 | * | 12/2003 | Ito et al. | 399/27 |
| 7,301,655 | B1 | * | 11/2007 | Zimmerman et al. | 358/1.15 |
| 2005/0095016 | A1 | * | 5/2005 | Simpson et al. | 399/12 |

* cited by examiner

*Primary Examiner*—Thierry L Pham

(57) ABSTRACT

Methods and apparatus wherein a removeable supplemental controller is used to adapt a paper processing system to changes in functionality, particularly when the processing system comprises a printer, and the supplemental controller is a MICR flash device, and the changes in functionality relate to accepting input from an electromechanical keylock added to the printer, and to sensing the presence of a MICR cartridge within the printer.

1 Claim, 3 Drawing Sheets

KEYLOCK FLASH DISK DEVICE

FIELD OF THE INVENTION

The present invention relates generally to paper processing systems, particularly printing systems, comprising paper processing machines such as printers and removable control cards.

BACKGROUND OF THE INVENTION

The use of paper processing systems that include paper processing machines such as printers, copiers and facsimile machines is now commonplace. Such machines typically include a paper source in the form of a tray or other device for holding paper to be processed, a paper feed mechanism for moving the paper through the machine, an imaging mechanism for transferring ink, toner, or some other marking material to the paper, a toner cartridge or other apparatus for providing a marking material to the imaging mechanism, and a controller for controlling the entire printing process from initial receipt of data to output of final product.

In many instances the paper processing machine controller (hereinafter simply "controller") may interact with various components of the system. As an example in the context of a printer, a controller may communicate with various sensors to determine if a paper tray and/or toner cartridge has been inserted into the printer, and to halt or otherwise modify paper processing based on the inputs it receives from the sensors.

In some instances, a paper processing system may comprise components from multiple manufacturers. As an example, a laser printer produced by a first manufacturer might use a toner cartridge from a second manufacturer, and might also use paper trays provided by a third manufacturer. Components provided by other manufacturers often provide additional functionality, even when the component provided is a replacement for a component originally provided with the processing machine.

When components that provide different functionality are included in a processing system after the processing machine has already been manufactured, the controller may not be able to take advantage of all the functionality provided. This problem may be overcome by replacing the controller, but replacement typically requires a high degree of technical skill as well as significant cost. As such, controller replacement is not always a desirable solution.

Another possibility in some instances is to reprogram the controller. However, doing so is often beyond the skill of the ordinary user, risks making the processing system inoperable, and does not provide a solution if additional inputs are to be provided to the controller.

Of particular interest herein are processing systems used to mark objects with marks, typically numbers and symbols, that can be recognized via magnetic ink character recognition (MICR). A common example of MICR characters can be found in the special numbers and symbols you typically see at the bottom of checks. In many instances such MICR processing systems comprise a printer or other processing machine (hereinafter "MICR printer") provided with an ink or toner cartridge (hereinafter "MICR cartridge") containing a marking material (hereinafter "MICR ink") suitable for printing or otherwise forming marks that can be recognized via MICR. MICR printers and cartridges are well known and thus need not be described in detail.

Also of interest herein are flash disk devices such as CompactFlash® cards, and USB flash disks. Flash disk devices are small, removable mass storage devices that weigh approximately one half of an ounce, and in some instances are the size of a matchbook. In some instances, they provide complete PCMCIA-ATA functionality and compatibility. Unlike many other mobile storage solutions, flash disk devices contain no mechanical parts and provide a constant, reliable, and non-volatile way of storing data without a power supply. Flash disk devices are typically designed with flash technology, a nonvolatile storage solution that does not require a battery to retain data indefinitely. Characteristics common to many flash cards are described in the CompactFlash Specification (all versions of which are herein incorporated by reference in their entirety) published and copyrighted by the CompactFlash Association. Characteristics common to many USB devices can found in the Universal Serial Bus Revision 2.0 specification. Characteristics of at least some USB flash disks can be found in U.S. Pat. No. 6,148,354. Said specifications and patent are herein incorporated by reference in their entirety.

SUMMARY OF THE INVENTION

The present invention is directed to paper processing systems and related methods that utilize a removable supplemental controller to at least partially adapt the system to changes in functionality that occur after the system is produced.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
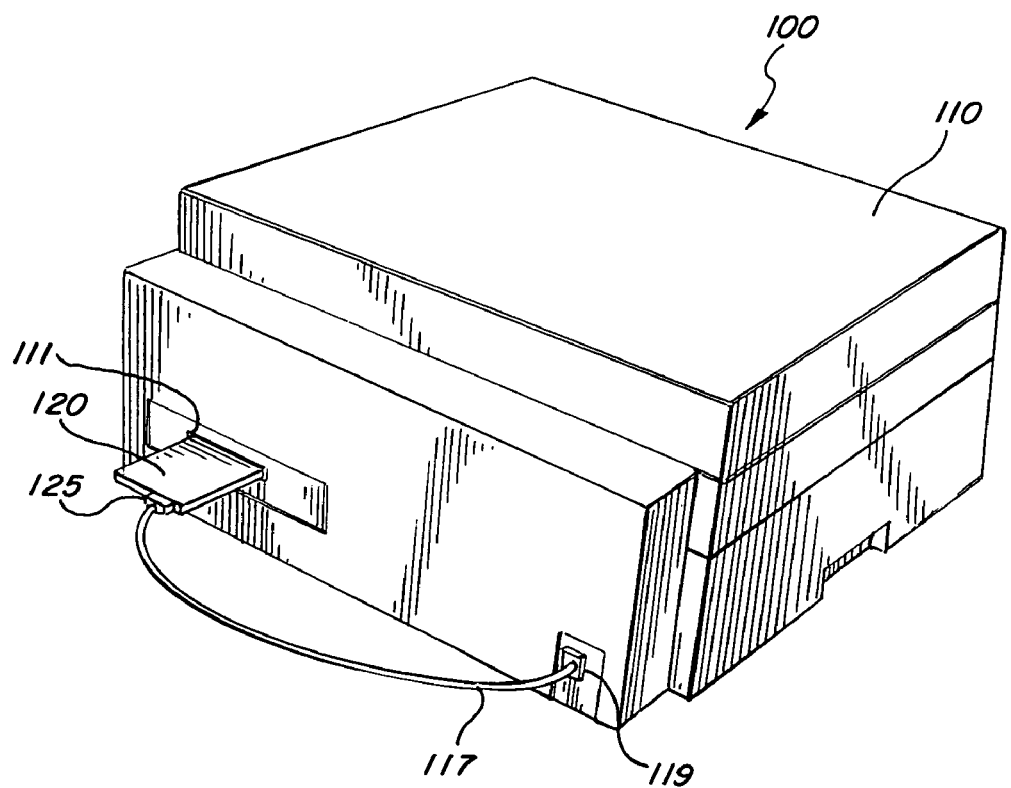
FIG. 1 is a perspective diagram of a MICR printer paper processing system.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

A printing system comprising a standard printer can be turned into a MICR printing system by using a MICR cartridge and possibly a mechanical keylock in conjunction with a MICR flash device. A MICR flash device, as used herein, implements the standard flash disk storage used by many devices such as digital cameras, solid-state disk drives, and some printers, but also extends the conventional concept of a flash disk to include the ability to perform MICR specific control functions such as MICR cartridge and electromechanical keylock sensing using the same flash disk device that provides flash disk memory to contain the necessary firmware to utilize the additional capabilities. MICR flash devices include, but are not necessarily limited to, devices that would typically be characterized as CompactFlash devices or USB devices.

It is believed that prior flash devices designed as flash disks are dedicated to that purpose, and that the designers of such flash devices have not anticipated a dual-role use of such devices for the purpose of MICR cartridge or MICR cartridge and keylock sensing in addition to providing flash disk functionality.

The use of such a MICR flash device to convert a printing system into a MICR printing system addresses at least the problem of providing MICR toner or ink cartridge and/or electromechanical keylock state sensing as part of a field installable flash device upgrade for printer models not originally designed to provide such capabilities, while optionally delivering on the same flash device the firmware necessary to extend the printer's standard logic to respond to the different states of the MICR and keylock sensors.

The MICR sensing capability embodied in a field installable flash device provides the benefit of upgrading existing printers to confirm that a cartridge uniquely configured to identify itself as a MICR cartridge, as distinguished from conventional non-magnetic toner or ink, has been installed within the printer prior to printing checks or other documents that require MICR. Accidentally printing such documents without first confirming the presence of a MICR cartridge can result in users incurring significant financial penalties as the direct result of submitting such misprinted documents to banking industry clearing houses. As a result, the ability for firmware operating within the printer to confirm the presence of a MICR cartridge prior to printing such documents provides a direct benefit to the user of such printers.

The electromechanical keylock state sensor embodied in a field installable flash device provides the benefit of upgrading existing printers to provide users with the ability to use conventional mechanical keys to authorize the firmware within the printer to print documents of varying security levels. The ability for printers to print checks that include MICR printed banking industry routing numbers introduces the potential for unauthorized users to use such printers for the purpose of printing fraudulent checks. As a result, the ability for firmware operating within the printer to confirm usage authorization, by the use of a mechanical key, to print such documents provides direct benefit to owners of such printers.

It is contemplated that the present invention may advantageously be used in conjunction with the toner cartridge identification system described in U.S. Pat. No. 6,477,335, herein incorporated by reference in its entirety.

Referring to FIG. 1, a printing system 100 comprises a printer 110, a secondary controller flash device (CFD) 120 (hereinafter "MICR controller") coupled to printer 110 via CFD connector 111, and a cable assembly 117 interconnecting sensor input/output (I/O) connector 125 of MICR controller 120 to sensor I/O connector 119 of printer 110. The MICR controller is "secondary" to the extent that it supplements the control functions of any internal controller(s) of printer 110. It is contemplated that in some instances the MICR controller sensor I/O connector will be coupled as shown to an external connector of printer 110, while in other instances it will be coupled either directly to one or more sensors, or coupled via connectors that are not external to printer 110.

It is contemplated that in some instances the primary controller of printer 110 will be adapted to interact with a flash device in a manner that allows the flash device to act as a print filter. In such instances, MICR controller 120 will preferably interact with printer 110 in the same manner as would such a filter card to allow controller 120 to simply be plugged into a flash device connector of printer 110 without requiring any modifications to the internal controller of printer 110.

It is preferred that CFD connector 111 (and any other CFD connector referenced herein) be a CompactFlash® connector meeting requirements such as those specified in the CompactFlash Specification published and copyrighted by the CompactFlash Association. However, it is contemplated that in alternative embodiments the connector may be a Universal Serial Bus (USB) connector (coupled to a corresponding USB interface) meeting the requirements such as those specified in the Universal Serial Bus Revision 2.0 specification. It is also contemplated that in other embodiments, alternate interfaces and/or connectors may be used to couple the controller flash device to a paper processing system or device.

Figure 2:
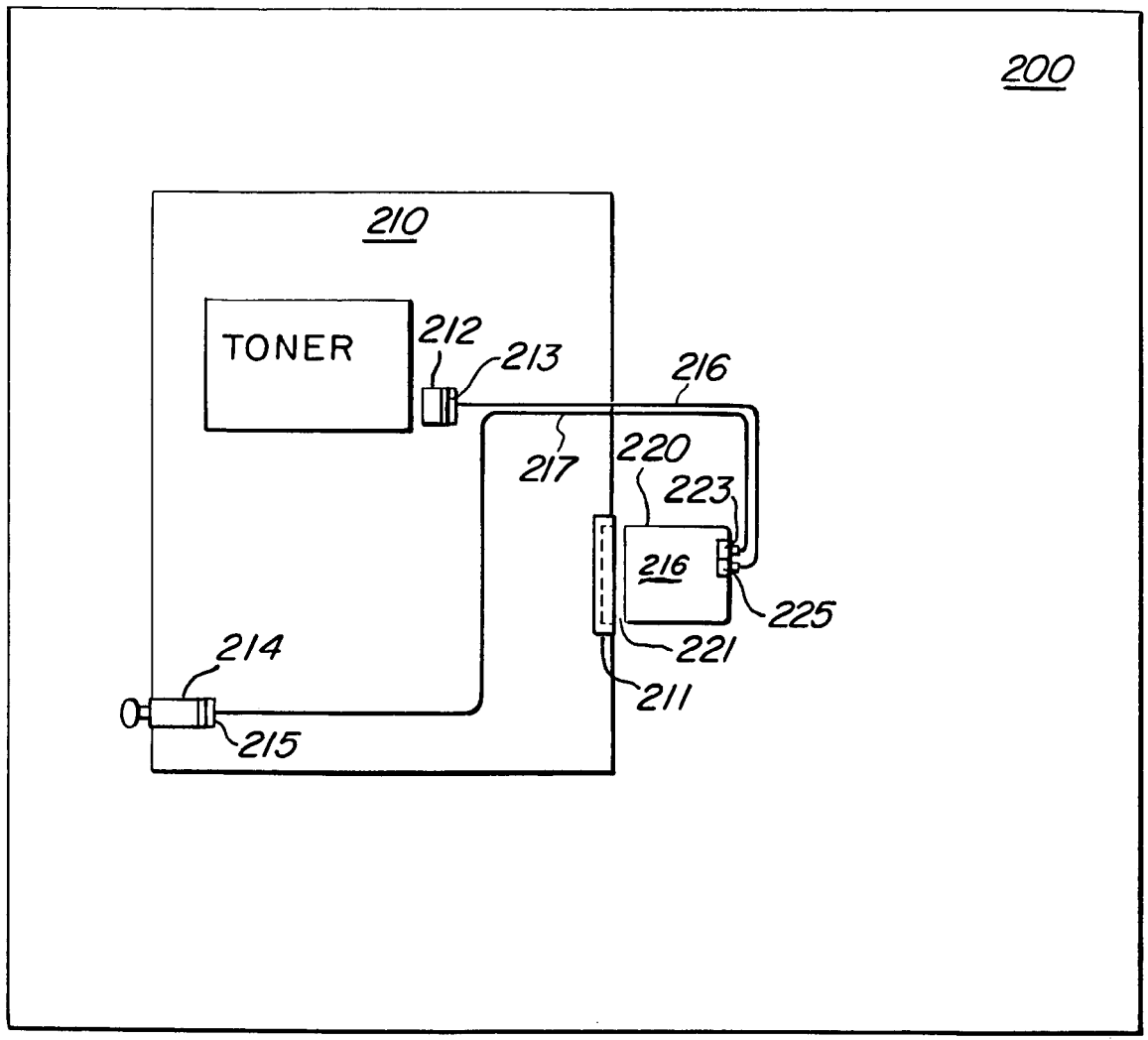
FIG. 2 is a block diagram of a MICR printing system having both keylock sensor and MICR cartridge sensors.

Referring to FIG. 2, a printing system 200 comprises a printer 210, and MICR controller 220. Printer 210 includes a flash device connector 211, an electromechanical keylock 214, and a keylock to MICR controller connector 215. MICR controller 220 includes a CFD connector 221 adapted to mate with CFD connector 211, a MICR cartridge sensor connector 223, and a keylock connector 225. Connector 223 is electrically coupled to connector 213 via cable assembly 216, and connector 225 is electrically coupled to connector 215 via cable assembly 217.

It is contemplated that keylock 214 may comprise any number of positions, but will advantageously comprise two or more positions.

In one embodiment, keylock 214 has two positions, each position being associated with one of the following job control states: "Print All", and "Print None". In such an embodiment, the MICR controller 220 is adapted and functions to prevent any jobs from being printed if the keylock 214 is set to "Print None", and to allow both MICR and non-MICR print jobs to print if set to "Print All". MICR controller 220 also is adapted and functions to prevent MICR print jobs from printing if a MICR toner cartridge sensor 212 does not sense the presence of a MICR toner cartridge.

In another embodiment, keylock 214 has two or more positions, each position being associated with one of the following job control states: "Print non-MICR Only", "Print MICR only", "Print All", and "Print None". In such an embodiment, the MICR controller 220 is adapted and functions to prevent or allow print jobs based on the function associated with the current position of the keylock. In such embodiments, when the keylock has such a position, the MICR controller 220 is adapted to prevent MICR print jobs from printing if keylock 214 is set to "Print non-MICR Only" or "Print None", to prevent non-MICR jobs from printing if the keylock is set to "Print MICR Only" or "Print None", to prevent both MICR and non-MICR print jobs from printing if the keylock is set to "Print None", and to allow both MICR and non-MICR print jobs to print if the keylock is set to "Print All". MICR controller 220 also is adapted and functions to prevent MICR print jobs from printing if a MICR toner cartridge sensor 212 does not sense the presence of a MICR toner cartridge.

In another embodiment, keylock 214 has three positions, each position being associated with one of the following job control states: "Print MICR Only", "Print All", and "Print None". In such an embodiment, the MICR controller 220 is adapted and functions to prevent non-MICR print jobs from printing if keylock 214 is set to "Print MICR Only" or "Print None", and to prevent MICR print jobs from printing if the keylock is set to "Print None". MICR controller 220 also is adapted and functions to prevent MICR print jobs from printing if a MICR toner cartridge sensor 212 does not sense the presence of a MICR toner cartridge.

In another embodiment, keylock 214 has three positions, each position being associated with one of the following job control states: "Print Non-MICR Only", "Print All", and "Print None". In such an embodiment, the MICR controller 220 is adapted and functions to prevent MICR print jobs from printing if keylock 214 is set to "Print Non-MICR Only" or "Print None", and to prevent Non-MICR print jobs from printing if the keylock is set to "Print None". MICR controller 220 also is adapted and functions to prevent MICR print jobs from printing if a MICR toner cartridge sensor 212 does not sense the presence of a MICR toner cartridge.

In another embodiment, keylock 214 has four positions, each position being associated with one of the following job control states: "Print MICR Only", "Print non-MICR Only", "Print All", and "Print None". The MICR controller 220 is adapted and functions to prevent non-MICR print jobs from printing if keylock 214 is set to "Print MICR Only" or "Print None", and to prevent MICR print jobs from printing if the keylock is set to "Print non-MICR only" or to "Print None". The "Print All" setting causes the MICR controller to allow both MICR and non-MICR jobs to be processes, and the "Print None" setting causes the MICR controller to prevent any jobs from printing.

It is contemplated that in some embodiments keylock 214 may physically lock a paper tray or other component into place in addition to being used to provide input to the MICR controller. If coupled to a paper tray, and possibly in other instances, keylock 214 may be said to be removably coupled to the printer 210. It is also contemplated that sensors in addition to or other than those described herein may provide inputs to the MICR controller. Such sensors may be used to sense any of a variety of conditions, may be removeably or permanently coupled to printer 210.

Figure 3:
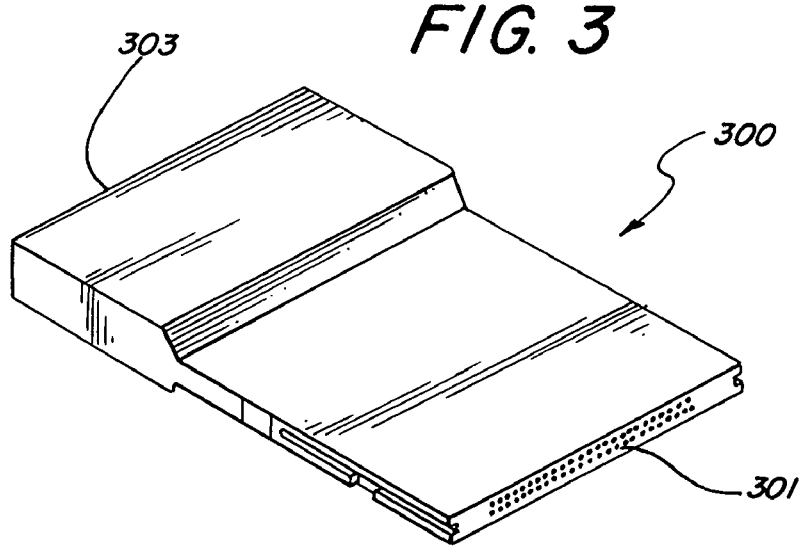
FIG. 3 is a perspective view of a MICR flash device.

Referring to FIG. 3, a preferred flash device 300 comprises a CFD connector 301, and at least one sensor connector 303. Sensor connector 303 may comprise a single connector for coupling the card to a single sensor, a single connector used to couple the card to multiple sensors, and/or multiple connectors to connect the card to multiple sensors. The actual dimensions of particular embodiments of flash devices may vary, with only limiting factor, other than practicality, being the need for the flash device to be coupled to a flash device connector.

Figure 4:
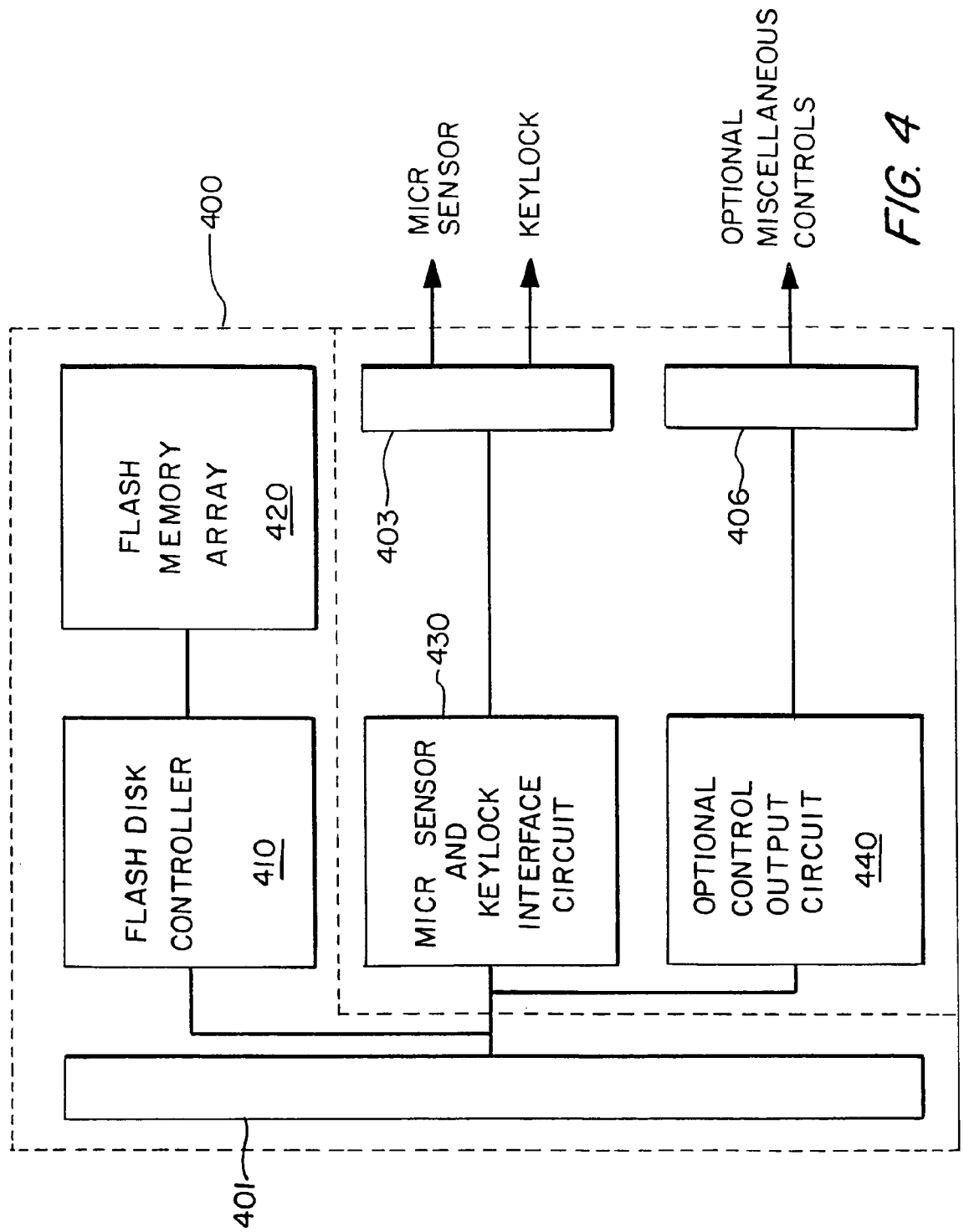
FIG. 4 is a block diagram of a MICR flash device.

Referring to FIG. 4, a preferred controller flash device 400 comprise a CFD connector 401, a sensor connector 403, an I/O connector 406, a flash disk controller, 410, a flash memory array 420, a MICR interface circuit 430, and an I/O control circuit 440. It is important to note that card 400 provides both flash disk memory and multiple I/O functionality. The multiple I/O functionality allows the flash device to interact with one or more sensors or actuators, while the flash disk controller 410 and flash memory array 420 allow the flash device to store, on a flash disk, data and/or software that facilitates the card's interaction with a primary controller. Alternative embodiments may have additional elements, and/or may include only a subset of the elements shown.

It is contemplated that paper processing systems other than printing systems may make similar use of a plug-in CFD in that the controller will be used to accept input from one or more sensors and to allow or disallow the processing of certain jobs depending on the sensor input. As such, contemplated paper processing systems comprising any type of paper processing machine including but not necessarily limited to copiers and facsimile machines. Although particularly well suited for control of MICR printing, control of non-MICR processing may also be accomplished through the use of plug-in CFD.

Similarly, the benefits of using plug-in CFDs are not limited to paper processing where the term "paper" is narrowly interpreted. As used herein, the term "paper" is used to refer to any substrate on which MICR marks may be formed, including but not necessarily limited to wood, plastic, metal, ceramic and/or composite substrates.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing an example of some such characterizations.

Some embodiments of the present invention may be characterized as a MICR printing system comprising a printer and a MICR flash device coupled to the printer wherein the MICR flash device is adapted to prevent printing of a MICR job when the printer is unable to use the contents of a MICR cartridge to print the job. Some embodiments may be further characterized as having the MICR flash device coupled to a sensor, positioned on or within the printer, where the sensor provides input to the card as to whether a MICR cartridge is installed. Some embodiments may be further characterized as comprising an electromechanical keylock that provides input to the card, and still further characterized as the keylock having at least three positions and provides an input to the card that identifies the current position. Some embodiments may also be characterized as having the card be adapted to perform any combination of two or more of the following functions: prevent any MICR job from printing while the keylock is in a first of multiple positions, to allow only MICR jobs to print while in a second of multiple positions, to allow no jobs to print while in a third of multiple positions, and to allow any job to print while in a fourth of multiple positions; as having a keylock with a separate position associated with each function of the combination; and having the card adapted to select the function to perform at a given point in time based at least in part on the then current position of the keylock.

The present invention may advantageously be used in conjunction with the toner cartridge identification system described in U.S. Pat. No. 6,477,335. As such, an embodiment of a printer system may include a printer cartridge that comprises a series of magnetic elements selected to counterbalance a series of magnetic elements on the printer, and each positioned to lie adjacent to a corresponding magnetic field detecting switch on the printer, where the position of the magnetic elements on the cartridge are located so as to change a condition of the corresponding magnetic field detecting switch when the cartridge is inserted into the printer.

Similarly, an embodiment of a processing system may include a printer cartridge identification system comprising: a printer cartridge having a plurality of magnetic elements disposed opposite a plurality of magnetic field detecting switches located on a printer; and, a printer having the plurality of magnetic field detecting switches corresponding to the plurality of magnetic elements on the printer cartridge and a plurality of fixed magnetic elements adjacent the plurality of magnetic field detecting switches, each fixed magnetic element biasing one of the magnetic field detecting switches to a first position; and, where the magnetic field detecting switches cooperate to define a printer cartridge identification code.

Another embodiment of a processing system may include a printer that is a printer cartridge identifying printer comprising: a magnetic field detecting switch adjacent a printer cartridge port and adapted to switch from a first position to a second position when a magnet on the printer cartridge is brought in proximity with the magnetic field detecting switch; circuitry on the printer for evaluating the position of the magnetic field detecting switch and determining whether the cartridge in the printer is of a specific type; and, a fixed magnetic element adjacent the magnetic field detecting switch to bias the magnetic field detecting switch to a predetermined position.

Yet another embodiment of a processing system includes a printer cartridge identification subsystem comprising: a printer comprising a plurality of magnetic field detecting switches adjacent to a plurality of fixed magnetic elements on the printer; each fixed magnetic element having a magnetic field of a predetermined polarity and each magnetic field detecting switch having a first biased position and a neutral position; and, a printer cartridge having a plurality of magnetic elements; each magnetic element having a magnetic field of identical polarity to a corresponding fixed magnetic element on the printer, whereby the magnetic field of the magnetic element on the printer cartridge interacts with the magnetic field of its corresponding fixed magnetic element on the printer to allow return of the adjacent magnetic field detecting switch to the neutral position from the first biased position.

Some embodiments of the present invention may also be characterized as a paper processing system comprising a flash device comprising at least one connector other than the flash device connector and adapted to modify the system behavior based on any input the flash device receives via the at least one connector.

Another characterization of some embodiments of the present invention is that they are a secondary print controller adapted to be coupled to a printer via a plug-in connector and to interact with the printer controller.

Yet another characterization of some embodiments of the present invention is that they are a method of modifying the behavior of a paper processing system comprising: providing a secondary controller adapted to be plugged into a flash device connector, the controller comprising at least one sensor connector other than a flash device connector; and integrating the secondary controller so as to cause it to modify the behavior of the system by plugging the secondary controller into the flash device connector, and coupling the secondary controller to at least one sensor via the at least one sensor connector. In such a method, in some instances the paper processing system is a printing system comprising a printer, and a MICR cartridge, and integrating the secondary controller prevents the system from printing MICR jobs unless a MICR cartridge is installed in the printer. In some such instances, the at least one sensor is a sensor that provides input to the card as to whether a MICR cartridge is installed. In some such instances, integrating the secondary controller causes a keylock on the printer to affect the behavior of the printing system. In some such instances, the keylock comprises at least two positions, and placing the keylock in one of the at least two positions causes the printing system to prevent any MICR job from printing, to allow only MICR jobs to print, to allow no jobs to print, or to allow any job to print.

Some embodiments of the present invention may also be characterized as a method of forming a paper processing system comprising: providing a paper processing machine having a flash device connector and at least one controller; adding at least one sensor to the paper processing machine; providing a secondary controller and connecting it to the paper processing machine via the flash device connector; coupling the secondary controller to the at least one sensor. In some instances, the paper processing machine is a printer. In some such instances the at least one sensor comprises a MICR cartridge sensor. In some such instances, the at least one sensor comprises a keylock position sensor.

It should be noted that the term "adapted to", as used herein indicates that the an element has one or more physical characteristics that render it suitable to satisfy a specified condition. As such, in some instances it is equivalent to saying the element is "sized and dimensioned" to satisfy the condition. In other instances, it may be that an element is programmed or comprises control circuitry that render it suitable to satisfy the specified condition.

What is claimed is:

1. A printing system, comprising:
a printer having a flash memory device connector;
a MICR sensor for sensing when MICR toner is in the printer;
a manual keylock selector for selecting printing options; and
a controller flash memory device adapted to be connected to the printer by the flash memory device connector, the controller flash memory device containing an interface for the MICR sensor, an interface for the manual keylock selector, a controller, and a memory, the manual keylock selector having multiple separate positions, and the controller flash memory device adapted to perform any combination of two or more of the following functions:
prevent any MICR job from printing while the keylock is in a first of multiple positions,
allow any MICR jobs to print while in a second of multiple positions,
allow no job to print while in a third of multiple positions, and
allow any job to print while in a fourth of multiple positions;
the controller flash memory device adapted to select the function to perform at a given position in time based at least in part on the current position of the keylock.

* * * * *